(12) United States Patent
Dazet et al.

(10) Patent No.: US 6,457,677 B2
(45) Date of Patent: Oct. 1, 2002

(54) AIRCRAFT DOOR AND AIRCRAFT FITTED WITH SUCH A DOOR

(75) Inventors: Francis Dazet, Saint Alban; Alain Depeige, Tournefeville; François Rouyre, Cornebarrieu; Ludovic Debanne, Plaisance du Touch, all of (FR)

(73) Assignee: Eads Airbus SA, Paris (FR)

(*) Notice: Subject to any disclaimer, the term of this patent is extended or adjusted under 35 U.S.C. 154(b) by 0 days.

(21) Appl. No.: 09/826,953

(22) Filed: Apr. 6, 2001

(30) Foreign Application Priority Data

Apr. 7, 2000 (FR) ............................. 00 04483

(51) Int. Cl.⁷ ................................. B64D 1/10
(52) U.S. Cl. .................. 244/137.2; 244/137.1; 244/137.3; 244/905
(58) Field of Search .................. 244/118.2, 119, 244/129.5, 118.3, 136, 137.1, 137.2, 905; B64C 1/22

(56) References Cited

U.S. PATENT DOCUMENTS

| | | | | |
|---|---|---|---|---|
| 2,641,967 A | * | 6/1953 | Bussiere et al. | 198/580 |
| 2,936,056 A | * | 5/1960 | Heyniger | 182/48 |
| 2,965,336 A | * | 12/1960 | Lissarrague | 524/494 |
| 3,454,245 A | * | 7/1969 | Burkdoll et al. | 182/48 |
| 3,465,991 A | * | 9/1969 | Banas et al. | 182/48 |
| 3,598,215 A | * | 8/1971 | Summer et al. | 193/25 B |
| 3,633,853 A | * | 1/1972 | Collins | 182/48 |
| 3,771,749 A | * | 11/1973 | Smialowicz | 182/48 |
| 3,910,532 A | * | 10/1975 | Fischer | 182/48 |
| 4,013,247 A | * | 3/1977 | Giffin | 182/48 |
| 4,106,729 A | * | 8/1978 | Bergman et al. | 193/25 B |
| 4,125,235 A | * | 11/1978 | Fitzgerald et al. | 244/129.5 |
| 4,279,405 A | * | 7/1981 | Buryakov et al. | 244/137.2 |
| 4,312,153 A | * | 1/1982 | Parkinson et al. | 244/129.5 |
| 4,375,876 A | * | 3/1983 | Stewart | 160/201 |
| 4,375,877 A | * | 3/1983 | Shorey | 182/48 |
| 4,407,468 A | * | 10/1983 | Bement et al. | 102/378 |
| 4,441,582 A | * | 4/1984 | Ward | 182/48 |
| 4,512,539 A | * | 4/1985 | Ackermann et al. | 244/137.2 |
| 4,717,096 A | * | 1/1988 | Labarre et al. | 114/375 |
| 4,723,628 A | * | 2/1988 | Fisher | 182/48 |
| 4,785,741 A | * | 11/1988 | Gronow | 105/348 |
| 4,978,089 A | * | 12/1990 | Alquier et al. | 102/223 |
| 5,102,070 A | * | 4/1992 | Smialowicz et al. | 182/48 |
| 5,379,971 A | * | 1/1995 | Kim et al. | 244/129.5 |
| 5,400,985 A | * | 3/1995 | Banks | 182/48 |
| 5,586,615 A | * | 12/1996 | Hammer et al. | 182/48 |
| 5,738,303 A | * | 4/1998 | Hamatani et al. | 244/129.1 |
| 5,823,473 A | * | 10/1998 | Odell et al. | 244/129.5 |
| 6,059,230 A | * | 5/2000 | Leggett et al. | 244/129.4 |

FOREIGN PATENT DOCUMENTS

| | | |
|---|---|---|
| EP | 0009379 A1 | 2/1980 |
| EP | 0518461 B1 | 8/1995 |
| WO | WO 84/01140 | 3/1984 |
| WO | WO96/40556 | 12/1996 |

* cited by examiner

*Primary Examiner*—Charles T. Jordan
*Assistant Examiner*—Stephen A Holzen
(74) *Attorney, Agent, or Firm*—Thelen Reid Priest LLP; Robert E. Krebs

(57) ABSTRACT

The door (10) of an aircraft incorporates a housing (14) able to receive a slide, in a folded up state. The housing (14) is delimited between a cover (16) facing outwards from the door (10) and intermediate bulkhead (18). The cover (16) is jettisonable outside the aircraft or able to swivel by its lower edge on a threshold of the door, by the use of setting de-setting means. In one embodiment, the housing occupies the greater part of the door surface.

18 Claims, 5 Drawing Sheets

AIRCRAFT DOOR AND AIRCRAFT FITTED WITH SUCH A DOOR

TECHNICAL FIELD

The invention concerns an aircraft door. More exactly, it concerns a door allowing passengers to access the interior of the aircraft, said door incorporating an emergency evacuation slide.

The invention also concerns an aircraft fitted with at least one door of this type.

THE PRIOR ART

On aircraft intended for transporting passengers, the regulations lay down that emergency evacuation slides must be present which are able to allow the rapid evacuation of passengers in the event of an accident.

Emergency evacuation slides are usually constituted by inflatable structures, which are stored in the folded up state, in a location provided for this purpose within the aircraft.

Furthermore, the locations in which the slides are stored are selected in order that, in the event of an accident, the slides are deployed underneath at least some of the exits from the aircraft, able to be opened under accident conditions. These exits may be doors usually used for the loading and unloading of passengers or emergency exits usable only in accident conditions.

The requirements stated above lead aircraft builders either to incorporate the locations for storing the slides in the doors liable to be used in the event of an accident, or to incorporate these locations in the fuselage, just beneath the doors or in fairings, close to the doors.

In the first case, the most commonly used solution consists in housing the emergency evacuation slide under a cover forming a bulge towards the interior of the aircraft, in the lower part of the door. When the door is closed after loading the passengers, the cabin personnel set a system allowing the slide housed in the bottom of the door to be mechanically attached to the threshold of the latter.

In the event of an accident, the slide is therefore attached to the threshold of the door. When the latter is opened, the slide deploys automatically outwards from of the aircraft by inflating when activated by means provided for this purpose, generally under the threshold of the door.

Among the documents which illustrate this mode of storing slides will be cited as examples the documents U.S. Pat. Nos. 3,771,749, 4,106,729, WO-A-84/01140 and WO-A-96/40556.

The particular drawback of this conventional solution is its requirement for the slide to be passed through a slot formed in the bottom of the door, when the latter is opened in an emergency evacuation situation. The time required for the slide to be deployed therefore increases its volume. And this is all the larger the greater the size of the aircraft and, particularly the greater the height of the door relative to the ground. Indeed, the volume of the folded slide increases naturally with its deployed length, which must allow the door threshold to be connected with the ground in all the positions liable to be adopted by the aircraft in the event of an accident.

Furthermore, given that deployment of the slides is usually effected through slots formed in the bottom of the doors, the slides are necessarily stored in housings which are also located in the bottom of the doors. This entails the presence of bulges in the bottom of the doors, into the passenger cabin. These bulges translate into a loss of room and prevent seats from being placed immediately behind doors designed in this way.

Moreover, in the case of very long slides, the volume taken up by the bulges formed at the bottom of the doors may render the mechanisms usually providing the opening of the doors unusable. Indeed, the projection serving to house the slide would then interfere with the door frame. In this circumstance, recourse to another solution is imperative.

It is also known, as shown particularly in the document EP-A-0 518 461, for emergency evacuation slides to be housed in locations incorporated in the aircraft fuselage, underneath door thresholds.

This solution does not have the drawbacks of the previous one since the volume serving to house the slide is dissociated from the door. However, it leads to additional apertures being made in the aircraft fuselage, on the same cross-section as the door apertures. To avoid embrittlement of the aircraft structure at this level, braces have to be provided, which is not without consequence on the mass and the cost of the plane.

Furthermore, the document EP-A-0 009 379 describes an emergency exit allowing evacuation from a building, a boat or an aircraft. It includes a fixed rectangular frame, a housing forming a door, whose lower edge is articulated on the frame and an inflatable slide housed in the casing. Activating a bolt triggers the swivelling of the casing outwards and the inflation of the slide.

DISCLOSURE OF THE INVENTION

The precise object of the invention is an aircraft door whose original design allows it to incorporate an emergency evacuation slide of great length without increasing in an unacceptable way its deployment time, while avoiding having to resort to a separate location, incorporated under the door threshold, in the aircraft fuselage.

According to the invention, this outcome is obtained by means of an aircraft door, including a rigid structure having one face turned outwards from the aircraft, said rigid structure incorporating a housing able to receive an emergency evacuation slide, in a folded up state, characterised in that the housing is delimited, on said face of the rigid structure, by a cover able to open to allow deployment of the slide outwards from the aircraft.

This original design makes it possible to provide a very rapid deployment of the slide, whatever its size, which makes the invention particularly adapted to the case of aircraft of very large size, in which the passenger cabin floor is a long way from the ground.

In a first embodiment of the invention, the housing in which the emergency evacuation slide is stored extends over the greater part of the door surface. This particular arrangement of the housing in which the emergency evacuation slide is folded away, over the greater part of the door surface, allows its thickness to be appreciably reduced, relative to a housing located in the door bottom, for an identical volume. Consequently, there is no significant projection towards the interior of the aircraft.

In this first embodiment of the invention, the housing is delimited to advantage towards the interior of the aircraft by an intermediate bulkhead approximately parallel to the cover, so that the housing has an approximately uniform thickness. Preferably, the housing is also delimited laterally and upwards by an inverted U-shaped frame.

In this case, the cover is to advantage attached to the frame by detachable fixing means so as to be able to be ejected outwards from the aircraft.

The back bulkhead is still an integral part of the rigid door structure. According to circumstances, the frame is also an integral part of the rigid structure or is added to this structure.

Furthermore, tightness means are provided, in a usual way, around the door. According to circumstances, these tightness means may be located either approximately in the extension of the intermediate bulkhead, or approximately in the extension of the cover. This latter solution is preferred, since it allows the aerodynamic noises generated by the cavity formed by the door-fuselage interstice to be reduced.

To advantage, the door also includes a lower stepped edge, comprising a closed inner part and an open outer part, communicating with the volume in which the slide is received and offset downwards relative to the closed inner part, so as to form a step. This arrangement makes it possible to increase slightly the volume available for the slide, without increasing too much the size of the aperture made in the aircraft fuselage.

According to a second embodiment of the invention, the cover is attached to the rigid structure by detachable fixing means and setting de-setting means are provided between a lower edge of the cover and the door threshold.

In this case, the setting de-setting means may include at least one shackle mounted on the lower edge of the cover, a receptacle formed on the door threshold and a hook articulated on the door threshold, so as to be able to trap the shackle between the receptacle and the hook.

As a variant, the setting de-setting means may also include at least one pin mounted on the lower edge of the cover and a slotted latch, swivel mounted on the door threshold, so as to be able to trap said pin in the latch slot.

Furthermore, another object of the invention is an aircraft including at least one door as defined above.

BRIEF DESCRIPTION OF THE DRAWINGS

There will now be described, as non-restrictive examples, different embodiments of the invention, with reference to the appended drawings, in which.

DETAILED DESCRIPTION OF PREFERRED EMBODIMENTS OF THE INVENTION

Figure 1:
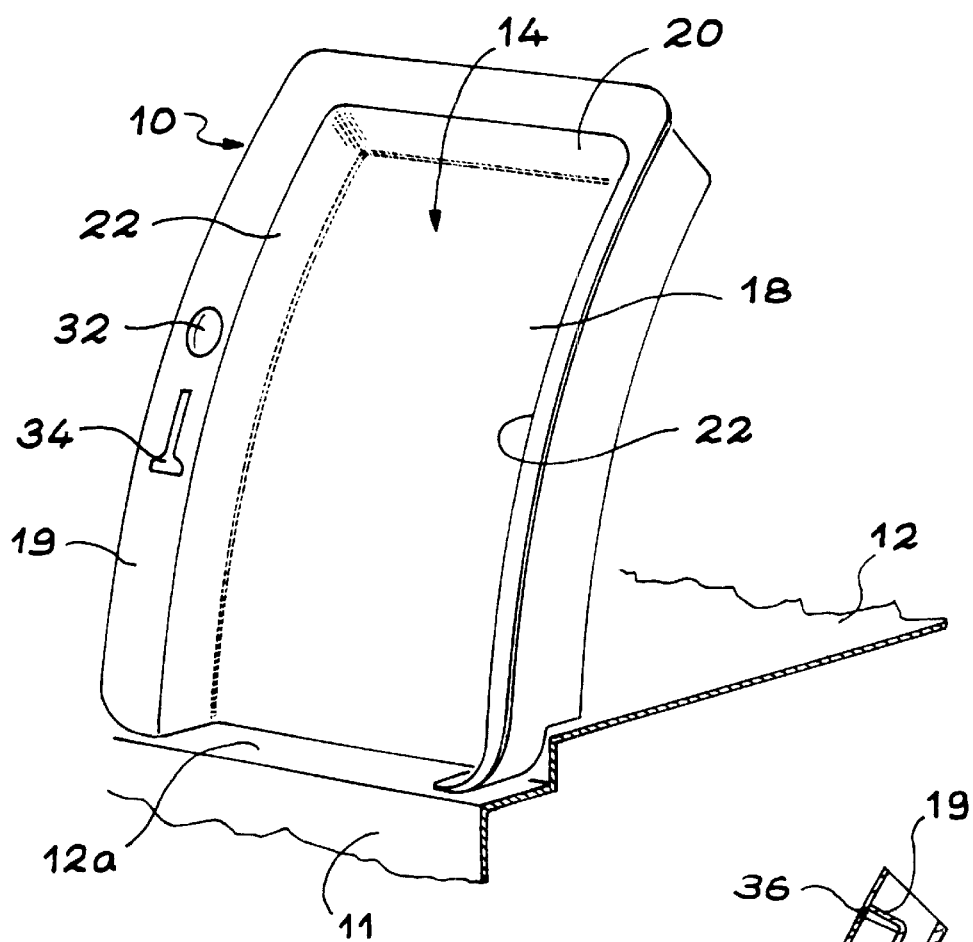
FIG. 1 is a perspective view which shows diagrammatically, from the outside of an aircraft, an access door whose cover has been intentionally omitted so as to show the volume in which a slide may be placed, according to the invention.

In FIG. 1 has been shown diagrammatically an aircraft door 10 according to the invention. The door 10 is a door allowing passengers to access the cabin provided to receive them within the aircraft. Only a part of the floor 12 of this cabin appears in FIG. 1.

The door 10 has generally an approximately rectangular shape, and it is formed in a curve so that its outer surface is located in the extension of the outer surface of the fuselage 11, when it is closed. The door 10 then blocks an aperture of complementary shape provided in the fuselage 11 of the aircraft and provides an undisturbed aerodynamic flow of air around the plane.

In a known way, the door 10 includes a rigid structure one face of which facing outward from the aircraft is flush with the outer surface of the fuselage when the door is closed. According to the invention, the rigid structure of the door includes, on the side of its outer face, a recess forming a housing 14 in which is received an emergency evacuation slide 30 (FIG. 2), in a folded up state.

More exactly, in the embodiments shown in FIGS. 1 to 5, the housing 14 is delimited between a cover 16 (FIG. 2) embodying an outer wall of the door 10, facing outwards from the aircraft and an intermediate bulkhead 18, embodying the back of the housing 14. The intermediate bulkhead 18 is approximately parallel to the cover 16, in such a way that the thickness of the housing 14 is approximately uniform, or constant. Moreover, in this case, the thickness of the housing 14 is approximately equal to or slightly greater than half the total thickness of the door 10, as shown particularly in FIG. 2. This arrangement allows the housing in which the slide is stored to occupy the greater part of the door surface.

It should be noted that, as a variant, the housing 14 may be delimited externally by a non structural casing placed on the door, such as a leading edge fairing on a tailless aircraft or else a wing-to-fuselage attachment fairing. The volume thus created then makes it possible to receive, wholly or not, the slide in its folded up state, without really reducing the thickness of the structural part of the door.

The housing 14 has an approximately rectangular shape and extends over the greater part of the height and over the greater part of the width of the door 10.

More exactly, the housing 14 is delimited laterally and upwards by a frame 19. This frame 19 includes an upper bulkhead 20 and two lateral bulkheads 22.

Given that the housing 14 extends over the greater part of the surface of the door 10, it may have a volume equal to or greater than that of the housings usually provided to receive slides within aircraft, in the bottom of each of the doors, without it being necessary to increase overmuch the thickness of the door 10 relative to the thickness of a door not fitted with such a housing. Consequently, an appreciable space is freed within the cabin intended to receive passengers, in particular close to the floor 12. It particularly becomes possible to install seats immediately behind the door. Moreover, conventional opening control mechanisms can be retained.

Of course, the outer surface of the cover 16, which constitutes the greater part of the outer surface of the door 10, is located, without discontinuity, in the extension of the outer surface of the aircraft fuselage.

Setting means (not shown) allowing the slide to be attached mechanically to the door threshold when the door is closed after passengers have boarded may be of the same type as those fitted to existing aircraft. The same is true of the means allowing the slide to be deployed automatically by inflation, under accident conditions. As has been shown diagrammatically in FIG. 2, these means may particularly include a tank 24 placed underneath the floor 12 and containing a gas such as nitrogen. This tank 24 is connected by a flexible pipe 26 and a venturi tube 28 to the slide 30, when the setting means are activated.

The cover 16 forming the outer wall of the door 10 is preferably attached to the door frame 19 by detachable fixing means 36 allowing it to be automatically ejected when the slide inflation procedure is initiated. As an example which is in no way restrictive, these fixing means may be of the same type as those which attach to the fuselage the cover closing the volume serving to receive the folded up slide in the document EP-A-0 518 461.

When the inflation process of the slide 30 is triggered, the cover 16 is ejected. The slide 30 is then inflated. Lastly, the door 10 is opened to allow the passengers to evacuate the plane.

The means serving to control the opening and closing of the door 10 may be constituted by any means known to the man skilled in the art, liable to be used for this purpose on an aircraft door. They do not form part of the invention and will not therefore be described.

As shown diagrammatically in FIG. 1, one of the uprights of the frame 19, delimited between one of the lateral bulkheads 22 and the corresponding lateral edge of the door, is sufficiently wide to allow the incorporation into it of a fibre optic bulkhead fitting 32 for example and a handle 34 accessible from outside the aircraft.

Figure 2:
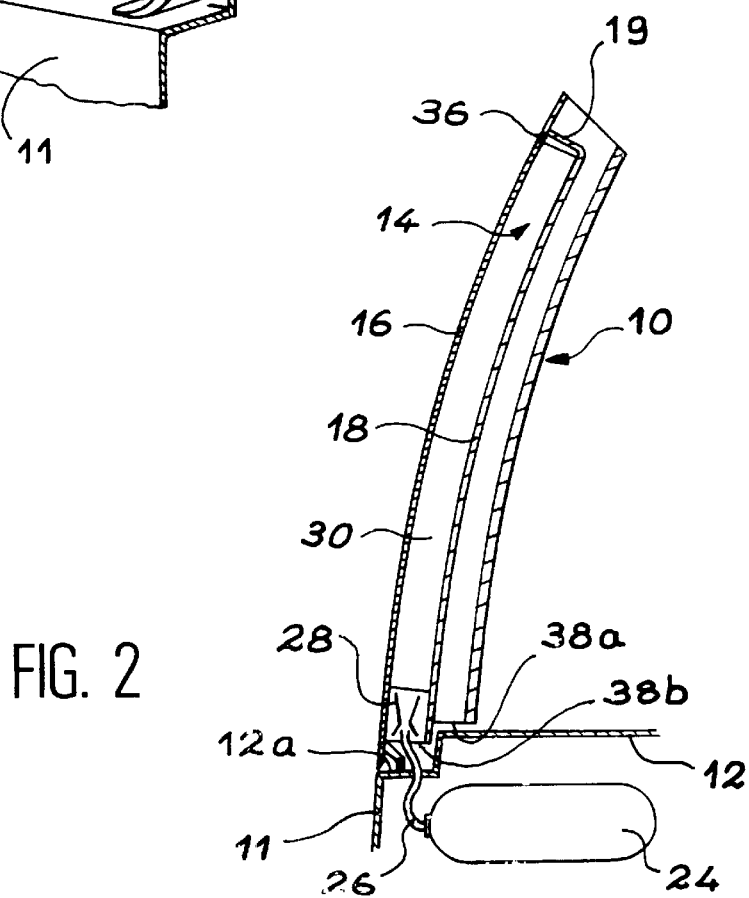
FIG. 2 is a vertical cross-section view of the door shown in FIG. 1.

In order to increase the height of the housing 14 available for the slide 30 without otherwise increasing the aperture formed in the fuselage, the lower edge of the door 10 may be step shaped, as shown in FIGS. 1 and 2. This lower stepped edge then includes an upper part 38*a,* towards the interior of the aircraft and a low part 38*b,* towards the exterior of the aircraft. These two parts 38*a* and 38*b* of the lower edge of the door are separated by the intermediate bulkhead 18. The upper part 38*a* is closed and located above the floor 12 of the cabin. The lower part 38*b* is open and emerges directly in the housing 14. It is located above a step 12*a,* located below relative to the aircraft cabin floor 12.

A description will now be given, with reference in succession to FIGS. 3, 4 and 5, of three particular embodiments of the door according to the invention.

Figure 3:
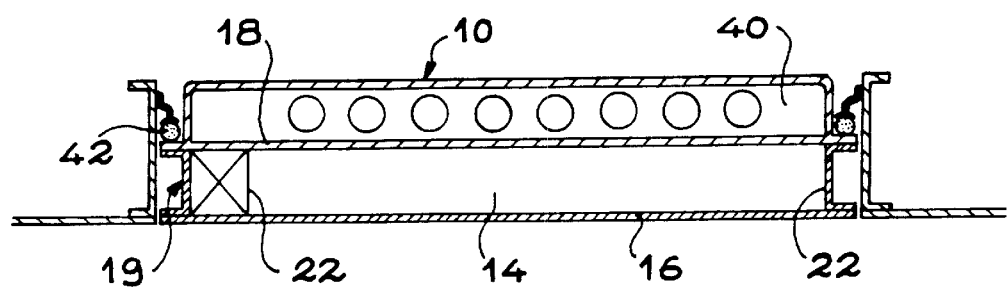
FIG. 3 is a horizontal cross-section view of the door in FIG. 1, showing a first embodiment of the invention.

In a first embodiment, shown in horizontal cross-section in FIG. 3, the intermediate bulkhead 18 is an integral part of a rigid structure 40 embodying the part of the door facing the interior of the aircraft. On the other hand, the frame 19 is added onto this structure 40 and has no specific rigidity.

Furthermore, in this embodiment in FIG. 3, tightness between the pressurised cabin and the outside of the aircraft is provided by a seal 42 placed around the door, approximately in the extension of the intermediate bulkhead 18. The housing 14 in which the slide is received is then not pressurised.

Figure 4:
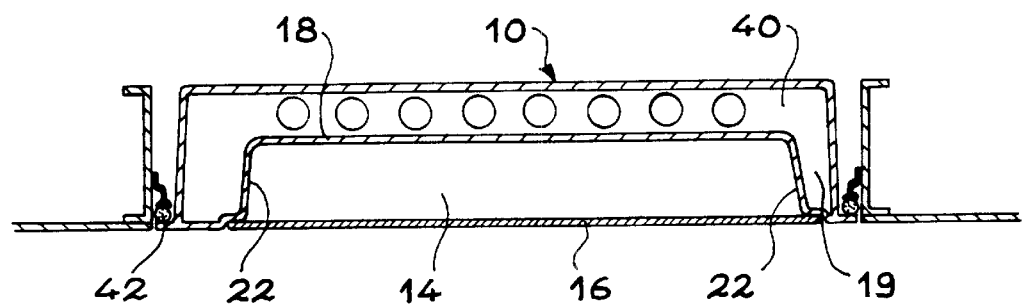
FIG. 4 is a horizontal cross-section view comparable to FIG. 3, showing a second embodiment of the invention.
Figure 5:
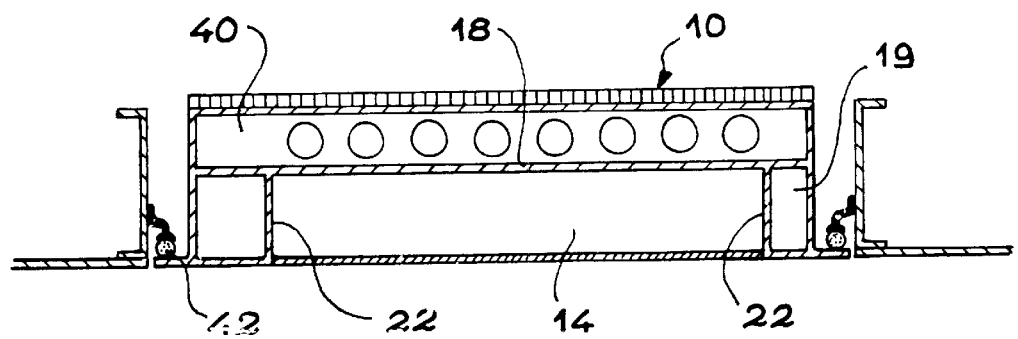
FIG. 5 is a horizontal cross-section view comparable to FIGS. 3 and 4, showing a third embodiment of the invention.

In a second embodiment of the invention shown in FIG. 4, the intermediate bulkhead 18 and the frame 19 form an integral part of the rigid structure 40 of the door 10. In this case, the seal 42 placed around the door 10 is located approximately in the extension of the cover 16 forming the outer wall of the door 10. The housing 14 in which the slide is received is then located in the pressurised zone of the aircraft.

In a third embodiment of the invention shown diagrammatically in FIG. 5, the door structure is similar to that in the embodiment shown in FIG. 3 and the seal is arranged in the same way as in the second embodiment described with reference to FIG. 4.

More exactly, the back bulkhead 18 forms an integral part of the rigid structure 40 of the door 10, whereas the frame 19 is added onto this rigid structure.

On the other hand, the seal 42 is placed around the door 10 approximately in the extension of the cover 16 forming its outer wall.

A description will now be given of a fourth embodiment of the invention with reference to FIGS. 6 to 8. To simplify matters, the corresponding components are denoted by the same numerical references.

In this case, the housing 14 is formed in the bottom part of the rigid structure of the door 10, within a bulge 13 which projects into the passenger cabin, as on existing doors. However, according to the invention, this housing 14 is delimited by a cover 16 on the outer face of the door.

The cover 16 is normally made integral with the rigid structure by fixing means (not shown) able to allow rapid opening of the cover when the slide stored in the folded away state in the housing 14 is to be deployed to provide an emergency evacuation from the aircraft. These fixing means may be of the same type as those which attach the cover 16 to the rigid door structure in the embodiments described previously with reference to FIGS. 1 to 5.

Moreover, setting de-setting means 45 are provided between the lower edge of the cover 16 and the door threshold. These setting de-setting means 45 allow the lower edge of the cover to be attached to the door threshold when the door is closed and allow any attachment between these components to be eliminated when the door is to be opened to provide the loading and unloading of passengers.

Figure 6:
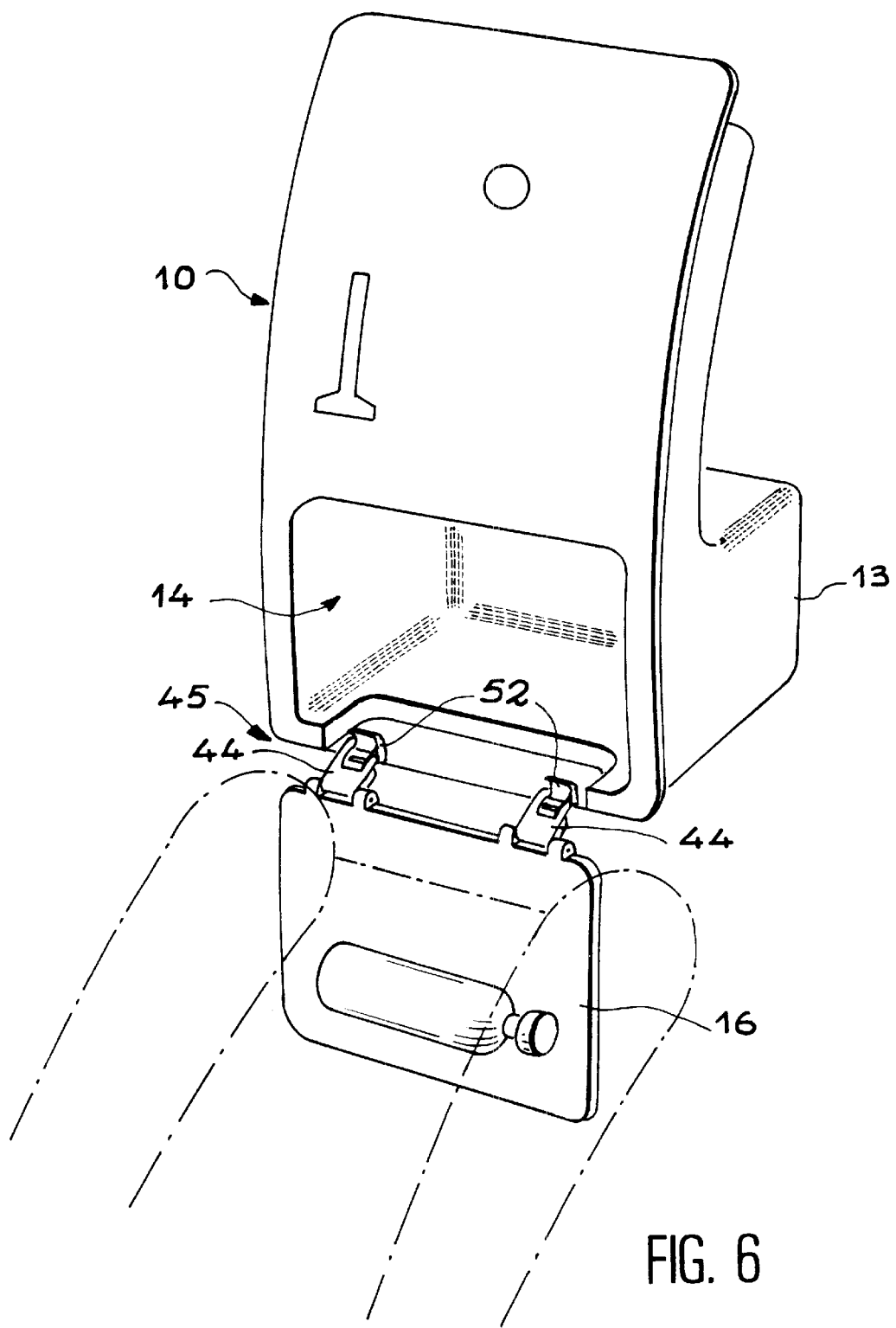
FIG. 6 is a perspective view showing an aircraft door made according to a fourth embodiment of the invention, after opening of the cover and deployment of the slide.
Figure 7:
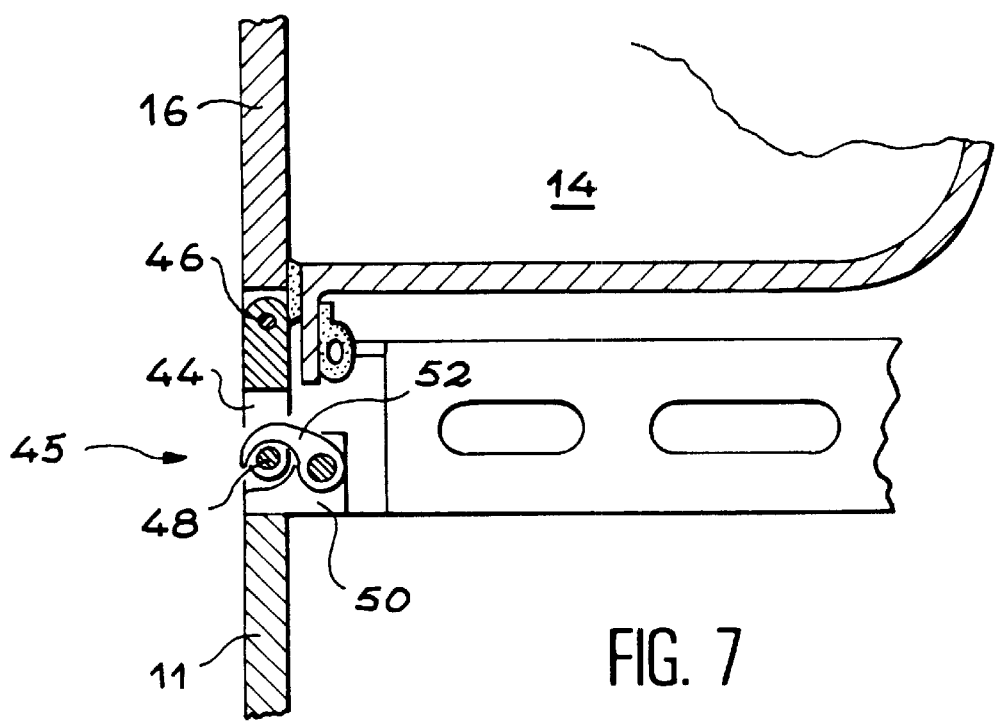
FIG. 7 is a cross-section view showing on a larger scale one of the mechanisms able to attach the cover to the door threshold, in the embodiment in FIG. 6, in normal operation.
Figure 8:
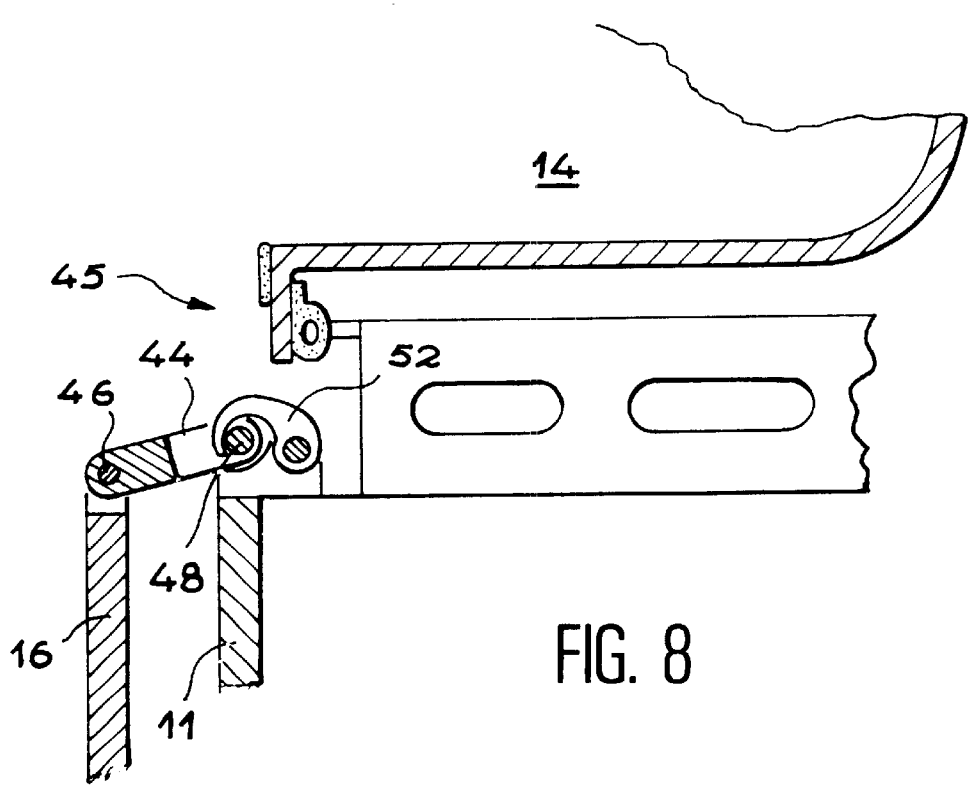
FIG. 8 is a view comparable to FIG. 7, showing the mechanism after opening of the cover.

In the embodiment shown in FIGS. 6 to 8, the setting de-setting means 45 include two shackles 44 articulated on the lower edge of the cover 16 by approximately horizontal pins 46. At its lower end, each shackle 44 includes a rod 48, also approximately horizontal.

When the door 10 is closed, the rod 48 is supported against a receptacle 50 formed on the door threshold. A hook 52 articulated on the door threshold may then be manoeuvred by the cabin personnel, as shown diagrammatically in FIG. 7, to trap the rod 48 between the receptacle 50 and the hook 52. Thus a swivelling attachment is created between the cover 16 and the door threshold.

In this way, when the setting de-setting means 45 are set and an emergency evacuation of the aircraft is to be carried out, the detachable fixing means (not shown) which attach the cover 16 to the rigid structure of the door are automatically detached and the cover swivels downwards, to pass from the position shown in FIG. 7 to the position shown in FIG. 8. The slide is deployed then very rapidly outside the aircraft through the large cross-section aperture thus provided in the door.

When the door is to be opened to allow passengers to access the aircraft, the setting de-setting means 45 are de-set by the cabin crew, in a known way, by manoeuvring the hooks 52.

Figure 9:
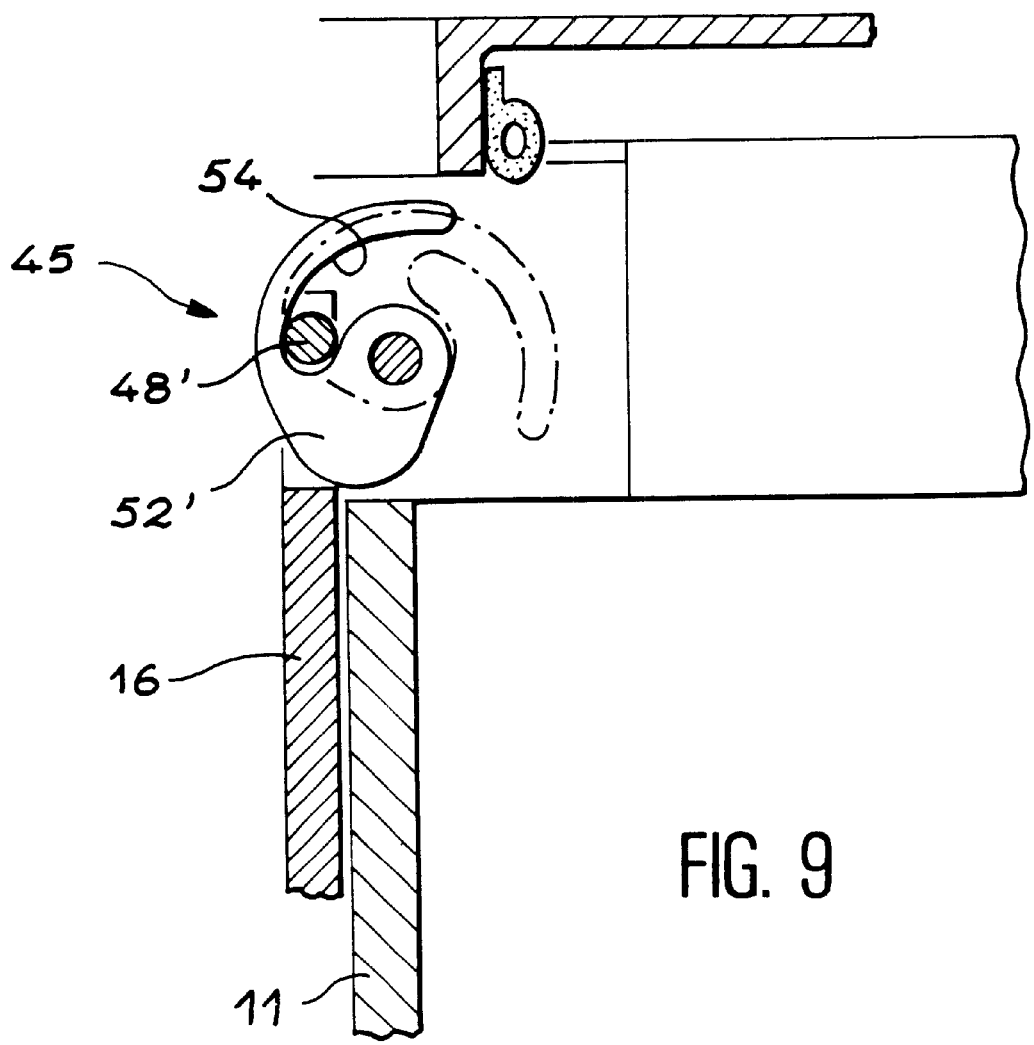
FIG. 9 is a view comparable to FIG. 8, showing a variant of the fourth embodiment of the invention.

The embodiment variant in FIG. 9 is distinguished essentially from the embodiment in FIGS. 6 to 8 by the fact that the setting de-setting means 45 include in this case at least one approximately horizontal pin 48' fixed to the lower edge of the cover 16 and a latch 52' swivel mounted on the door threshold. The latch 52' has a slot 54, in a circle arc, open at one of its ends. Swivelling the latch 52' in a clockwise direction allows the pin 48' to be trapped, which has the effect of attaching in swivelling way the lower edge of the cover 16 to the door threshold. De-setting is obtained by swivelling the latch 52' in the reverse way.

Clearly, the invention is not limited to the embodiments which have just been described by way of examples. Thus, it will be understood particularly that the step 12a may be eliminated or replaced by an inclined floor, without departing from the context of the invention.

What is claimed is:

1. An aircraft passenger door comprising a rigid structure having a surface exterior to an aircraft, said rigid structure comprising a housing said housing having an emergency evacuation slide folded within, said housing further comprising a removable cover disposed on said exterior surface of said rigid structure wherein when said cover is removed and said housing is opened said slide deploys outwards of the aircraft.

2. An aircraft passenger door according to claim 1, wherein the housing (14) extends over the greater part of the door surface.

3. An aircraft passenger door according to claim 2, wherein the housing is delimited, towards the interior of the aircraft, by an intermediate bulkhead (18) approximately parallel to the cover (16), so that the housing (14) has an approximately uniform thickness.

4. An aircraft passenger door according to claim 3, wherein the housing (14) is delimited laterally and upwards by an inverted U-shaped frame (19).

5. An aircraft passenger door according to claim 4, wherein the cover (16) is attached to said frame (19) by detachable fixing means (36), so as to be able to be ejected outwards from the aircraft.

6. An aircraft passenger door according to claim 4, wherein the intermediate bulkhead (18) and the frame (19) are an integral part of the rigid structure (40).

7. An aircraft passenger door according to claim 4, wherein the intermediate bulkhead (18) is an integral part of the rigid structure (40) and the frame (19) is added onto said structure.

8. An aircraft passenger door according to claim 3, wherein tightness means (42) are provided around the door, approximately in the extension of the intermediate bulkhead (18).

9. An aircraft passenger door according to claim 3, wherein tightness means (42) are provided around the door, approximately in the extension of said cover (16).

10. An aircraft passenger door according to claim 1, wherein said door includes a lower stepped edge, comprising a closed inner part and an open outer part, the open outer part communicating with said housing (14) and offset downwards relative to the closed inner part.

11. An aircraft passenger door according to claim 1, wherein the cover (16) is attached to the rigid structure (40) by detachable fixing means (36) and setting de-setting means (45) are provided between a lower edge of the cover (16) and the door threshold.

12. An aircraft passenger door according to claim 11, wherein the setting de-setting means (45) include at least one shackle (44) mounted on the lower edge of the cover (16), a receptacle (50) formed on the door threshold and a hook (52) articulated on the door threshold, so as to be able to trap the shackle between the receptacle and the hook.

13. An aircraft passenger door according to claim 11, wherein the setting de-setting means (45) include at least one pin (48') mounted on the lower edge of the cover (16) and a latch (52') with a slot (54), swivel mounted on the door threshold, so as to be able to trap said pin in the latch slot.

14. An aircraft passenger door according to claim 5, wherein the intermediate bulkhead (18) and the frame (19) are an integral part of the rigid structure (40).

15. An aircraft passenger door according to claim 5, wherein the intermediate bulkhead (18) is an integral part of the rigid structure (40) and the frame (19) is added onto said structure.

16. An aircraft passenger door according to claim 7, wherein tightness means (42) are provided around the door, approximately in the extension of the intermediate bulkhead (18).

17. An aircraft passenger door according to claim 7, wherein tightness means (42) are provided around the door, approximately in the extension of said cover (16).

18. An aircraft passenger door according to claim 9, wherein said door includes a lower stepped edge, comprising a closed inner part and an open outer part, the open outer part communicating with said housing (14) and offset downwards relative to the closed inner part.

* * * * *